United States Patent [19]

Mizumukai et al.

[11] Patent Number: 4,561,524
[45] Date of Patent: Dec. 31, 1985

[54] DAMPING FORCE REGULATION DEVICE FOR TELESCOPE SHOCK ABSORBER

[75] Inventors: Ken Mizumukai, Iwakura; Tatuya Masamura; Hiroshi Yamanaka, both of Kani, all of Japan

[73] Assignee: Kayaba Kogyo Kabushiki Kaisha, Tokyo, Japan

[21] Appl. No.: 461,082

[22] Filed: Jan. 26, 1983

[30] Foreign Application Priority Data

Feb. 1, 1982 [JP] Japan .................. 57-12645[U]

[51] Int. Cl.⁴ .................................................. F16F 9/348
[52] U.S. Cl. ............................ 188/319; 188/322.14; 188/322.15
[58] Field of Search ............... 188/319, 320, 322.22, 188/322.14, 282, 285, 287, 322.15, 322.13, 299, 315, 317, 318, 316, 280; 137/493.7, 625.31

[56] References Cited

U.S. PATENT DOCUMENTS

| | | | |
|---|---|---|---|
| 2,327,295 | 8/1943 | Whisler | 188/280 |
| 3,420,341 | 1/1969 | Keehn | 188/319 |
| 3,559,776 | 2/1971 | Schultze | 188/319 |
| 4,313,529 | 2/1982 | Kato et al. | 188/319 |

Primary Examiner—Duane A. Reger
Assistant Examiner—Michael P. Gilday
Attorney, Agent, or Firm—Jordan and Hamburg

[57] ABSTRACT

A damping force regulation device for a telescopic shock absorber causes all the hydraulic fluid to flow through a damping force adjuster (variable orifice) which is arranged in series with damping valves, both in expansion and contraction strokes of a piston. The diameter of the orifice is variable to control the damping force over a substantial range and thereby set up a damping characteristic optimum for each specific running condition. During the expansion stroke, a check valve of a base valve is opened to eliminate short suction which would otherwise result in cavitation or noise.

11 Claims, 7 Drawing Figures

DAMPING FORCE REGULATION DEVICE FOR TELESCOPE SHOCK ABSORBER

BACKGROUND OF THE INVENTION

The present invention relates to a telescopic shock absorber and, more particularly, to an improvement in a damping force regulation device for a double tube type teslescopic shock absorber.

Damping force required for a wheeled vehicle varies over a substantial range depending upon the running conditions of the vehicle. For example, while the vehicle runs in an urban area at relatively low speeds, a soft damping characteristic is needed in order to promote comfortable ride; while the vehicle cruises on a thruway at relatively high speeds, the damping characteristic has to be hard to insure stability of the vehicle.

A hydraulic shock absorber enabling the damping force to be controlled in accordance with the running conditions is disclosed in Japanese Patent Laid Open Publication No. 54-117486/79, for example. The disclosed prior art shock absorber includes a variable orifice arranged in a piston in parallel with a damping valve, so that the effective sectional area of the orifice may be controlled from the outside to adjust the damping resistance. This expedient is not fully acceptable, however, because hydraulic fluid is allowed to flow through the damping valve even though the orifice may be fully closed. The fluid routed through the damping valve limits the adjustable range of the damping force between the full-closed position and the full-opened position of the orifice, making it impossible to set up optimum damping characteristics throughout various operating conditions of a vehicle.

SUMMARY OF THE INVENTION

A damping force regulation device for a telescopic shock absorber embodying the present invention includes a tubular shell and a tube coaxially received in the shell. A piston is slidable within the tube and has first and second damping valves arranged in parallel therein. The first damping valve opens upon expansion of the shock absorber while the second damping valve opens upon contraction of the shock absorber. Means is provided for adjusting the damping force and is arranged in series with the first and second damping valves. The piston and cylinder define an upper fluid chamber and a lower fluid chamber at opposite sides of the piston. The cylinder and shell define a reservoir chamber. The reservoir chamber and upper fluid chamber are intercommunicated by a first passageway. The reservoir chamber and lower chamber are intercommunicated by a second passageway. A base valve is positioned in a lower portion of the cylinder and in the second passageway.

In accordance with the present invention, a damping force regulation device for a telescopic shock absorber causes all the hydraulic fluid to flow through damping force adjusting means (variable orifice) which is arranged in series with damping valves, both in expansion and contraction strokes of a piston. The diameter of the orifice is variable to control the damping force over a substantial range and thereby set up a damping characteristic optimum for each specific running condition. During expansion stroke, a check valve of a base valve is opened to eliminate short suction which would otherwise result in cavitation or noise.

It is an object of the present invention to provide a damping force regulation device for a telescopic shock absorber which renders the damping force adjustable over a remarkably wide range to a magnitude which is optimum for any specific running condition of a vehicle.

It is another object of the present invention to provide a generally improved damping force regulation device for a telescopic shock absorber.

Other objects, together with the foregoing, are attained in the embodiments described in the following description and illustrated in the accompanying drawings.

DESCRIPTION OF THE PREFERRED EMBODIMENTS

While the damping force regulation device for a telescopic shock absorber of the present invention is susceptible of numerous physical embodiments, depending upon the environment and requirements of use, substantial numbers of the herein shown and described embodiments have been made, tested and used, and all have performed in an eminently satisfactory manner.

Figure 1:
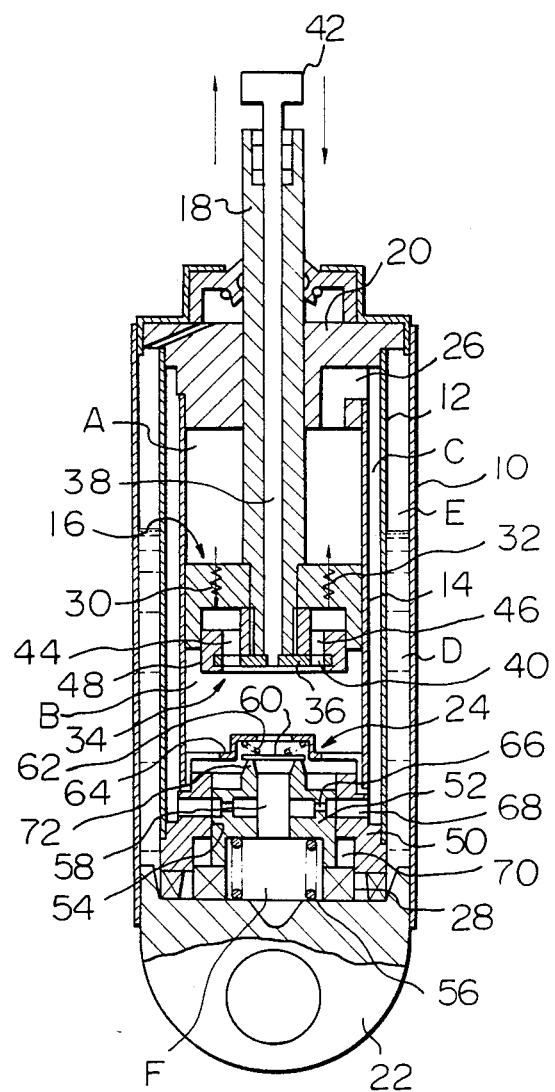
FIG. 1 is a sectional view of a damping force regulation device embodying the present invention.

Referring to FIG. 1 of the drawings, the telescopic shock absorber comprises a tubular shell 10 in which an outer tube 12 and an inner tube 14 are fixed in place in a coaxial manner. A piston 16 is slidably received in the inner tube 14. A piston rod 18 extends upwardly from the piston 16 and throughout a bearing 20 which is fixed to the top of the shell 10, outer tube 12 and inner tube 14. The piston rod 18 terminates at a bracket (not shown) which is mounted on a vehicle body. The lower end of the shell 10 carries therewith a bracket 22 to which is connected a wheel axle (not shown). A base valve 24 is mounted to the lower ends of the outer and inner tubes 12 and 14. The piston 16 defines fluid chambers A and B thereabove and therebelow, respectively, in cooperation with the bearing 20 and base valve 24. The inner and outer tubes 14 and 12 define therebetween an annular fluid chamber which may serve as a communication passageway as will be described. The fluid chambers A and C are intercommunicated by a passageway 26 which is formed through the bearing 20. Further, the shell 10 and outer tube 12 define therebetween an annular reservoir chamber D, the upper part of which forms a gas chamber E. A passageway 28 provides constant fluid communication between the reservoir chamber D and a valve chamber F which is formed at the bottom of the base valve 24. Arranged in parallel in the piston 16 are first and second damping valves 30 and 32 which open in directions opposite to each other when the piston 16 moves during expansion and contraction strokes, respectively. Hydraulic fluid is communicated to the damping valves by way of damping force regulator means, which is generally designated by the reference numeral 34.

The damping force regulator means 34 includes a disc 36 which is supported by the lower end of a control rod 38. The control rod 38 extends coaxially throughout the piston rod 18 and is rotatable relative to the piston rod 18. The disc 36 is formed with a plurality of orifices 40 of different diameters. A rotary solenoid 42 is mounted on the upper or outermost end of the control rod 38 so as to drive the control rod 38 for a controllable amount of rotation relative to the piston rod 18. With this construction, rotation of the control rod 38 causes the disc 36 to rotate so that the effective diameters of bores 44 and 46, which are respectively communicated with the valves 30 and 32, are controlled in accordance with the diameters of orifices 40 aligned therewith.

A casing 48 is in threaded engagement with the lower end of the piston rod 18 to define the bores 44 and 46 and accommodate the disc 36 thereinside.

The base valve 24 has a valve casing 50 which is fixedly supported by the inner and outer tubes 14 and 12. A valve spool 52 is slidably fit in a bore 54 formed throughout the valve casing 50. The valve spool 52 is biased upwardly by a spring 56 which is preloaded between the bottom of the valve spool 52 and the top of the bracket 22. The valve spool 52 is thus movable to a position where fluid pressures in the chambers B and F become equilibrated. An axial passageway 58 extends along the axis of the valve spool 52 to provide fluid communication between the chambers B and F. During contraction stroke of the piston 16, the passageway 58 will be blocked up by a check valve 60 which will have then been urged by a spring 62. The check valve 60 is retained by a support member 64 through the spring 62. Radial passageways 66 extend through the valve spool 52 so that the axial passageway 58 may be selectively brought into communication with passageways 68 in the valve casing 50 in accordance with a position of the valve spool 52. Each passageway 68 is communicated to the annular fluid chamber C. An annular dashpot chamber 70 is defined between the outer periphery of the spool 52 and the inner periphery of the casing 50 in order to dampen sharp upward movement of the spool 52.

Figure 2:
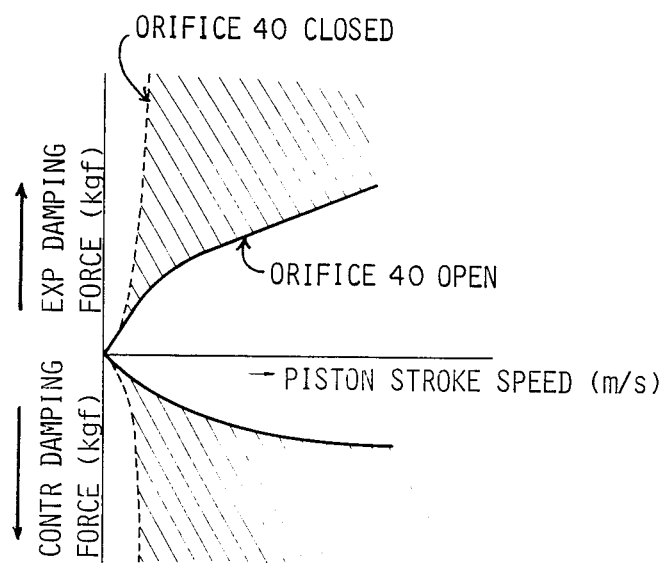
FIG. 2 is a plot showing damping characteristics achievable with the regulation device of FIG. 1.

In operation, as the piston 16 strokes upwardly or in the expanding direction together with the piston rod 18, the contracting upper fluid chamber A tends to be pressurized while the expanding lower fluid chamber B tends to be depressurized. In this situation, the valve spool 52 of the base valve 24 is moved upwardly by the spring 56 and the fluid pressure developed in the valve chamber F, until the radial passageways 66 become discommunicated from the passageways 68. At the same time, the check valve 60 unblocks the axial passageway 58 of the valve spool 52 to introduce the fluid or oil into the fluid chamber B from the reservoir chamber D via the passageway 28 and valve chamber F. Meanwhile, the oil in the upper chamber A flows into the lower chamber B via the damping valve 30, because the fluid pressure in the annular chamber C has been elevated due to the physical isolation of the passageways 68 from the passageways 66. All the hydraulic fluid passed through the valve 30 is routed through the bore 44 which is vertically aligned with the valve 30 toward the variable orifice 40. The damping force, therefore, can be practically controlled over a substantial range in conformity to the orifice diameter which is selectable by rotating the disc 36 in advance through the control rod 38. This will be seen from the plot shown in FIG. 2. In FIG. 2, solid curves represent controls which will be effected upon opening the orifice 40 (full-open), while dotted curves represent controls which will be effected upon substantially closing the orifice 40. The hatched area above or below the abscissa, which indicates a piston stroke speed, shows the intermediate control range. When the orifice 40 is substantially closed, a great damping force is attainable due to leakage of the oil.

In a contraction stroke wherein the piston rod 18 moves deeper into the tube assembly, the pressure in the lower chamber B is raised and the pressure in the upper chamber A, lowered. Then, the check valve 60 of the base valve 24 blocks the axial passageway 58 of the valve spool 52 and this spool 52 moves downwardly compressing the spring 56, until the radial passageways 66 become aligned with the passageways 68. Under this condition, all the oil in the lower chamber B is routed into the upper chamber A via the bore 46 and damping valve 32. Because the fluid chamber C is now in communication with the reservoir chamber D via the passageways 68 and 66, valve chamber F and passageway 28, a proportion of the oil equal to a volume of the piston rod 18 which has penetrated the inner tube 14 is allowed into the reservoir chamber D via the passageway 26, chamber C, passageways 68 and 66, chamber F and passageway 28. Again, all the oil in the chamber B is passed through the orifice 40 so that the damping force can be controlled to a significant extent merely by changing the orifice diameter.

Now, the embodiment shown in FIG. 1 is far superior to the prior art shock absorbers of the type concerned but still involves a possibility of farther improvement. The check valve 60 of the base valve 24 is designed to rest on a valve seat 72 which is formed at the top of the valve spool 52. Upon displacement of the spool 52, the check valve 60 tends to oscillate through the spring 62 rendering the operation unstable and thereby causing the damping force to fluctuate.

Figure 3:
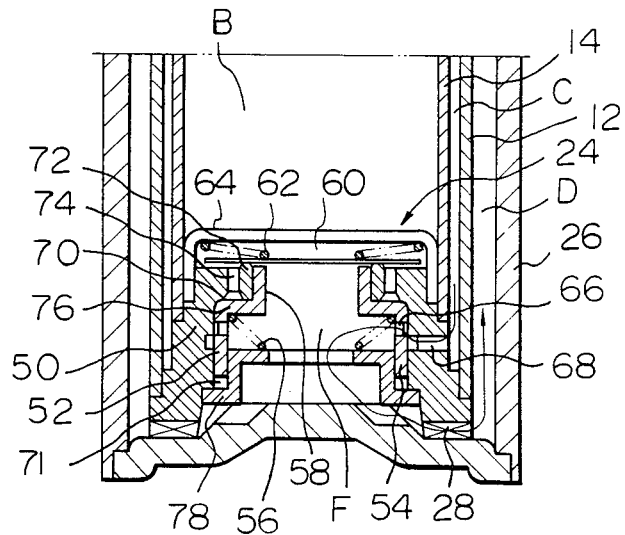
FIG. 3 is a sectional view of another embodiment of the present invention.

Referring to FIG. 3, another embodiment of the present invention is shown which is successful to overcome such a problem. In FIG. 3, the same reference numerals as those shown in FIG. 1 designate the same structural elements. As shown, the base valve 24 comprises the generally cylindrical valve casing 50 which is fixed to the lower ends of the inner and outer tubes 14 and 12. The casing 50 is formed with a shoulder 70 in its inner periphery to define the upper stroke limit of the valve spool 52. The casing 50 has an annular top which is formed with a valve seat 72. The casing 50 is formed with pressure induction ports 74 therethroughout which surround the valve seat 72, whereby a fluid pressure in the chamber B is communicated to an annular shoulder 76 of the spool 52. The spring 62 associated with the check valve 60 is retained by the support member 64 which is rigid on the casing 50. A spool guide 78 is disposed inside the spool 52 and fixedly retained by the lower end of the casing 50. The spring 56 is preloaded between the spool guide 78 and the spool 52. The dashpot chamber 71 is defined between the spool 52 and the spool guide 78.

With this construction, the valve spool 52 is prevented from interfering with the check valve 60 when moved up or down in response to a change in the pressure inside the lower chamber B. The check valve 60, therefore, will move to its open position only when the shock absorber is expanded to lower the pressure inside the chamber B. Meanwhile, because the pressure in the chamber B acts on the shoulder 76 of the spool 54 via the ports 74, the spool 52 is movable in response to a pressure differential between the chamber B and F so that the passageways 66 and 68 are brought into and out of intercommunication in the same manner as in the first embodiment.

Thus, it will be seen that the arrangement shown in FIG. 3 prevents the check valve 60 from being caused into oscillation during displacement of the valve spool 52. This insures accurate actions of the check valve 60 and therefore accuracy in damping characteristic.

In the embodiment shown in FIG. 1, the damping force is controllable by operating the regulator means 34. However, as will also be seen from FIG. 2, a simple change of the orifice 40 is insufficient for substantially varying the damping force in the medium and high piston speed ranges in which the effect of the orifice 40 remains constant, although it succeeds in so varying the damping force in the low piston speed range in which the proportion of the fluid flow through the orifice 40 is substantial. Additionally, the damping force is liable to reach an excessive level when the diameter of the orifice 40 is reduced.

Figure 4:
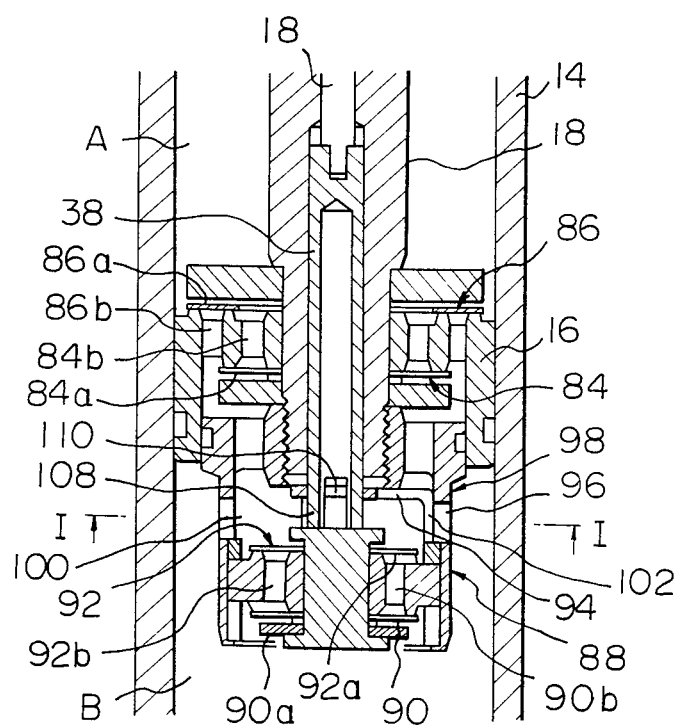
FIG. 4 is a sectional view of a third embodiment of the present invention.
Figure 5A:
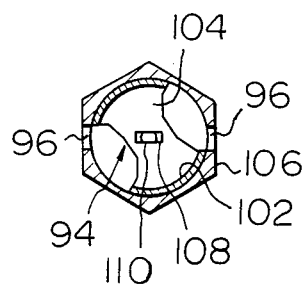
FIGS. 5a and 5b are sections each taken along line I—I of FIG. 4 and showing a specific position of a control valve.
Figure 5B:
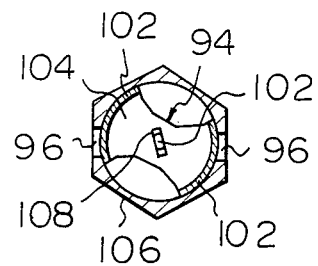

Referring to FIGS. 4, 5a and 5b, another embodiment of the present invention is shown which eliminates the drawbacks described above. As shown, damping valves 84 and 86 are arranged in parallel in the piston 16 to be opened when the shock absorber is expanded and contracted, respectively. The damping valves 84 and 86 respectively comprise yieldable leaf valve members 84a and 86a which are adapted to control ports 84b and 86b, respectively. The piston 16 has an annular upward projection which surrounds each of the radially outward ports 86b to form a valve seat for the leaf valve 86a. This maintains the upper chamber A in fluid communication with the radially inner ports 84b despite the presence of the leaf valve 86a.

A piston nut 88 is threaded into the lower end of the piston 16 and has thereinside second damping valves 90 and 92 which will open upon expansion and contraction of the shock absorber, respectively. As shown, the second damping valves 90 and 92 are arranged in tandem with the first damping valves 84 and 86. Additionally, a control valve 94 is supported by the control rod 38 in order to block and unblock bypass ports 96, which are formed through a cylindrical portion 98 of the piston nut 88 to diametrically oppose each other. The control valve 94 thus selectively permits a passageway 100 between the first damping valves 84 and 86 and the second damping valves 90 and 92 to have communication with the lower chamber B bypassing the second damping valves 90 and 92.

As shown in FIGS. 5a and 5b, the control valve 94 comprises a cylindrical member which is locally notched in a symmetrical manner to have two valve members 102 and an arm 104 bridging the valve members 102. The valve members 102 are individually held in sliding contact with the inner periphery of the cylindrical portion 98 of the piston nut 88. The control rod 38 carries at its lower end a hollow shaft 106 which has a generally rectangular leg 108 formed by shaving opposite sides of the shaft 106. The arm 104, on the other hand, is formed with an elongate slot 110 in its central area which is complementary in shape to the leg 108 of the shaft 106. The leg 108 is engaged in the slot 110 so that the control valve 94 is bodily moved integrally with the control rod 38. Like the first damping valves 84 and 86, the second damping valves 90 and 92 comprises leaf valves 90a and 92a which control ports 90b and 92b, respectively. The inlets of the ports 90b and 92b associated with the valves 90 and 92 are shaped such that the incoming flow through one of the leaf valves 92a and 90a is not interfered by the other.

In operation, when the control rod 38 is rotated to a position where the control valve 94 unblocks the bypass ports 96, the passageway 100 is brought into communication with the chamber B (see FIG. 5a). Then, during contraction stroke of the piston 16, the fluid in the chamber B is routed toward the chamber A via the bypass ports 96, where the resistance to the fluid flow is far smaller than at the second damping valves 92, and the passageway 100 while urging the first damping valve 86 to open. Likewise, during expansion stroke of the piston 16, the fluid in the chamber A is allowed into the passageway 100 forcing the first damping valve 84 to open and then into the chamber B via the bypass ports 96. As a result, the second damping valves 90 and 92 do not function at all; the damping force is developed by the first damping valves 84 and 86 only. This produces a relatively soft or ordinary level of damping characteristic.

When the control rod 38 is rotated to close the bypass ports 96 with the control valve 94, the passageway 100 between the first damping valves 84 and 86 and the second damping valves 90 and 92 becomes isolated from the chamber B (see FIG. 5b). Under this condition, the fluid in the chamber B during contraction stroke flows into the passageway 100 forcing the second damping valve 92 to open and then into the chamber A forcing the first damping valve 86 to open. The fluid thus flowing through the two valves 92 and 86 in succession is affected by a substantial resistance, developing a significant magnitude of damping force. It will be seen that the damping force exerted by the valve 92 is variable to adjust the damping characteristic over a substantial range. Upon expansion stroke of the piston 16, the fluid in the chamber A is passed through the intercommunicated first and second damping valves 84 and 90 to generate a considerable damping force in the manner described.

Figure 6:
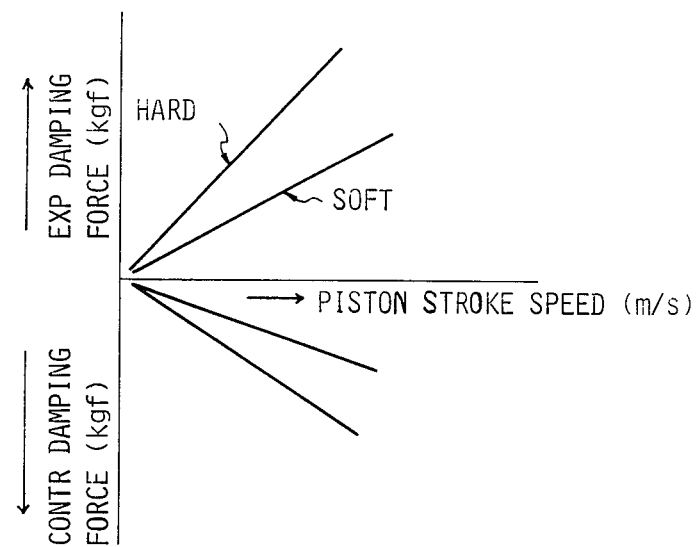
FIG. 6 is a plot showing damping characteristics achievable with the regulation device of FIG. 4.

The damping characteristics of the device described above with reference to FIGS. 4, 5a and 5b are plotted in FIG. 6. Thus, because both the first and second damping valves are selectively communicated in series, a substantial width of damping force adjustment is achievable from the low speed range to the high speed range of the piston stroke.

Various modifications will become possible for those skilled in the art after receiving the teachings of the present disclosure without departing from the scope thereof.

What is claimed is:

1. A damping force regulation device for a telescopic shock absorber, comprising:
   a tubular shell;
   an inner tube and an outer tube coaxially received in said shell;
   a piston slidably received in said inner tube and comprising first and second damping valves arranged in parallel therein, said first damping valve opening upon expansion of the shock absorber while said second damping valve opening upon contraction of the shock absorber;

damping force adjusting means arranged in series with the first and second damping valves for adjusting a damping force;

an upper fluid chamber and a lower fluid chamber individually defined by the piston and the inner tube at opposite sides of the piston;

a reservoir chamber defined by the outer tube and the tubular shell;

a first passageway for communicating said reservoir chamber and the upper fluid chamber to each other;

a second passageway for providing communication between the reservoir chamber and the lower fluid chamber; and a base valve positioned in a lower portion of the inner tube;

said base valve comprising a check valve disposed in the second passageway which communicates the lower fluid chamber to the reservoir chamber, first spring means biasing the check valve to a closed position, said check valve overcoming the bias of the first spring means and opening in response to an expansion stroke of the piston, a valve spool with an annular dashpot chamber disposed in the first passageway, second spring means biasing the valve spool in a direction to close off communication between the upper fluid chamber and the reservoir chamber, the valve spool overcoming the bias of the second spring means to communicate the upper fluid chamber to the reservoir chamber in response to a pressure elevation in the lower fluid chamber when the piston moves in a contraction stroke.

2. A damping force regulation device as claimed in claim 1, in which the damping force adjusting means comprises a variable orifice.

3. A damping force regulation device as claimed in claim 1, in which the piston further comprises third and fourth damping valves which are arranged in tandem with the first and second damping valves.

4. A damping force regulation device as claimed in claim 3, in which the damping force adjusting means comprises a control valve which selectively short-circuits a passageway between the first and second damping valves and the third and fourth damping valves.

5. A damping force regulation device as claimed in claim 3, further comprising a piston rod connected with the piston and a rotatable control rod extending coaxially throughout said piston rod to the outside of said inner tube, the damping force adjusting means further comprising drive means for driving said control rod for rotation.

6. A damping force regulation device as claimed in claim 5, in which the drive means comprises a rotary solenoid.

7. A damping force regulation device as claimed in claim 1, in which the base valve further comprises a cylindrical valve casing, the valve spool being slidably disposed in said valve casing.

8. A damping force regulation device as claimed in claim 7, in which the valve casing comprises a valve seat for the check valve which is formed in an upper portion of the valve casing, said valve spool having a shoulder, and a port formed through the valve casing radially outside said valve seat in order to communicate the fluid pressure in the lower fluid chamber to the shoulder of the valve spool.

9. A damping force regulation device as claimed in claim 2, further comprising a piston rod connected with the piston and a rotatable control rod extending coaxially throughout the piston rod to the outside of said inner tube, the damping force adjusting means further comprising drive means for driving the control rod for rotation.

10. A damping force regulation device as claimed in claim 4, further comprising a piston rod connected with the piston and a rotatable control rod extending coaxially throughout the piston rod to the outside of said inner tube, the damping force adjusting means further comprising drive means for driving the control rod for rotation.

11. A damping force regulation device as claimed in claim 9, in which the drive means comprises a rotary solenoid.

* * * * *